United States Patent
Huang et al.

(10) Patent No.: US 11,881,011 B2
(45) Date of Patent: Jan. 23, 2024

(54) FINGERPRINT ANTI-COUNTERFEITING METHOD AND ELECTRONIC DEVICE

(71) Applicant: HUAWEI TECHNOLOGIES CO., LTD., Guangdong (CN)

(72) Inventors: Qingchao Huang, Beijing (CN); Shuiping Long, Beijing (CN); Teng Shi, Nanjing (CN); Bing Chang, Beijing (CN); Xiaona Zhao, Shenzhen (CN); Wenchao Lei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/785,990

(22) PCT Filed: Dec. 10, 2020

(86) PCT No.: PCT/CN2020/135111
§ 371 (c)(1),
(2) Date: Jun. 16, 2022

(87) PCT Pub. No.: WO2021/121112
PCT Pub. Date: Jun. 24, 2021

(65) Prior Publication Data
US 2023/0018194 A1  Jan. 19, 2023

(30) Foreign Application Priority Data
Dec. 17, 2019 (CN) .......................... 201911300678.0

(51) Int. Cl.
*G06K 9/00* (2022.01)
*G06V 10/778* (2022.01)
(Continued)

(52) U.S. Cl.
CPC .......... *G06V 10/778* (2022.01); *G06T 7/0012* (2013.01); *G06V 10/803* (2022.01);
(Continued)

(58) Field of Classification Search
CPC .. G06V 10/778; G06V 10/806; G06V 10/803; G06V 40/1376; G06V 10/82;
(Continued)

(56) References Cited

U.S. PATENT DOCUMENTS

| 2016/0070968 | A1* | 3/2016 | Gu ........................ G06T 7/337 382/125 |
| 2017/0004351 | A1 | 1/2017 | Kim et al. |
| 2021/0233203 | A1* | 7/2021 | Ross ..................... G06T 1/0064 |

FOREIGN PATENT DOCUMENTS

| CN | 106663203 A | 5/2017 |
| CN | 109145834 A | 1/2019 |

(Continued)

OTHER PUBLICATIONS

International Search Report and Written Opinion issued in PCT/CN2020/135111, dated Mar. 8, 2021, 10 pages.
(Continued)

*Primary Examiner* — Abdul-Samad A Adediran

(57) ABSTRACT

A fingerprint anti-counterfeiting method and an electronic device are provided. The fingerprint anti-counterfeiting method includes: After detecting a fingerprint input action of a user, an electronic device obtains a fingerprint image generated by the fingerprint input action, and obtains a vibration-sound signal generated by the fingerprint input action. The device determines, based on a fingerprint anti-counterfeiting model, whether the fingerprint input action is performed by a true finger. The fingerprint anti-counterfeiting model is a multi-dimensional network model obtained through learning based on fingerprint images for training and corresponding vibration-sound signals. The fingerprint anti-counterfeiting method in embodiments of this application helps improve a protection capability of the electronic device for a fake fingerprint attack.

20 Claims, 6 Drawing Sheets

(51) Int. Cl.
   *G06V 10/80*   (2022.01)
   *G06V 10/82*   (2022.01)
   *G06V 40/12*   (2022.01)
   *G06T 7/00*    (2017.01)

(52) U.S. Cl.
   CPC ............ *G06V 10/806* (2022.01); *G06V 10/82* (2022.01); *G06V 40/1347* (2022.01); *G06V 40/1376* (2022.01); *G06V 40/1388* (2022.01); *G06T 2207/10132* (2013.01)

(58) Field of Classification Search
   CPC ............ G06V 40/1347; G06V 40/1388; G06T 7/0012; G06T 2207/10132; G06T 7/337; G06T 1/0064
   USPC ........................................................ 382/125
   See application file for complete search history.

(56) References Cited

FOREIGN PATENT DOCUMENTS

| | | |
|---|---|---|
| CN | 109670417 A | 4/2019 |
| CN | 110363120 A | 10/2019 |
| WO | 2019089432 A1 | 5/2019 |

OTHER PUBLICATIONS

Extended European Search Report issued in EP20903794.4, dated Nov. 24, 2022, 10 pages.

\* cited by examiner

FINGERPRINT ANTI-COUNTERFEITING METHOD AND ELECTRONIC DEVICE

This application is a National Stage of International Application No. PCT/CN2020/135111, filed on Dec. 10, 2020, which claims priority to Chinese Patent Application No. 201911300678.0, filed on Dec. 17, 2019, both of which are hereby incorporated by reference in their entireties.

TECHNICAL FIELD

This application relates to the field of computer technologies, and in particular, to a fingerprint anti-counterfeiting method and an electronic device.

BACKGROUND

Human fingerprints are different from each other, and are common biometric features for identity recognition. Currently, the fingerprints have been widely applied to fields such as device unlocking, an access control system, an attendance system, and financial payment. However, in daily life, fingerprint information is likely to be leaked and counterfeited. This brings a security risk to an identity authentication system based on fingerprint recognition. In addition, as intelligent terminals such as mobile phones enter a bezel-less screen era, an under-display optical fingerprint recognition solution has been a fingerprint recognition technology preferred by many vendors. With maturity of an under-LCD optical fingerprint recognition technology, the under-display optical fingerprint recognition solution has become a trend. Specifically, in the under-display optical fingerprint recognition technology, an under-display light source is used to emit light to a finger surface, and reflected light is converted, by using a photosensitive component, into an electrical signal including fingerprint information, to further complete fingerprint information recognition. However, because light can reach only an epidermis layer of finger skin but cannot reach a dermis layer, an optical fingerprint recognition device may be deceived by a fake fingerprint (especially a 3D fingerprint film) that is easy to produce and has low costs.

In conclusion, a fake fingerprint attack is a pain point in an existing fingerprint recognition technology, and causes extensive impact on user privacy and property security. Currently, solutions to the fake fingerprint attack may be summarized into two types. One type is solutions based on hardware. An additional hardware module is added to detect biometric feature signals of a dermis layer, a blood vessel, a heart rate, and blood oxygen of a finger, and detect a fake fingerprint attack in combination with fingerprint recognition. The other type is solutions based on software algorithms Based on features of true and fake fingerprints, an image recognition technology is used to determine whether a fingerprint image is true or fake.

In terms of the hardware-based solutions to the fake fingerprint attack, the industry proposes a solution that uses a combination of a fingerprint sensor and a heart rate sensor to recognize whether a fingerprint is true or fake. The heart rate sensor detects a heart rate based on a difference between blood content in soft tissue during systole and diastole, to further determine whether a fingerprint image is from a living object. For example, a vendor discloses its single-chip solution to live fingerprint detection. The solution uses an integrated hardware sensor to recognize a blood flow and a heart rate of a finger, to detect a fake fingerprint attack.

In addition, a solution that uses an optical coherence tomography technology and an optical microvascular angiography technology to determine whether a fingerprint is true or fake is also reported in related literature. In this solution, information about structures such as an epidermis layer, a dermis layer, and sweat glands of a fingertip is obtained by using an optical coherence tomography apparatus, and a microvascular structure and blood flow information are obtained by using an optical microvascular angiography apparatus, to further perform liveness detection based on the two types of obtained information. In addition, a disclosed patent shows that an infrared hardware module may be added to perform liveness detection by detecting various substances under a dermis layer of a finger based on an infrared reflectivity.

However, the hardware-based solutions to the fake fingerprint attack have the following disadvantages: First, an additional feature detection hardware module increases device costs. For example, costs of an optical coherence tomography apparatus are as high as hundreds of thousands of dollars, and there is a low probability that the apparatus is used in a mobile phone. Second, it is difficult to integrate an additional feature detection hardware module with a terminal device. Third, fake fingerprint attack methods emerge one after another. In the hardware-based solutions to the fake fingerprint attack, upgrading is difficult in the face of emerging new attack methods.

In terms of the software algorithm-based solutions to the fake fingerprint attack, related patents propose fake fingerprint detection solutions based on SVM and sparse representation and based on a naive Bayes classifier. In the two solutions, based on different conventional machine learning methods, true fingerprint and fake fingerprint image datasets are collected, feature extraction and learning are performed, and finally an obtained model is used to determine whether a fingerprint is true or fake. In addition, a related patent discloses a method for determining, by using a convolutional neural network, whether a fingerprint is true or fake. The neural network is trained by using a true fingerprint dataset and a fake fingerprint dataset. In a fingerprint recognition process, a convolutional neural network obtained through training is used to classify fingerprints into true or fake.

However, the solutions based on the software algorithms also have the following disadvantages: For example, a true fingerprint image and a fake fingerprint image have similar features, which are difficult to determine by human eyes. Conventional machine learning solutions lack in-depth mining of fingerprint information such as fingerprint texture features. A current deep learning solution is still limited on a small-area fingerprint sensor of a mobile device such as a mobile phone, and in particular, a 3D fake fingerprint attack recognition rate needs to be further improved.

SUMMARY

To reduce impact of an existing fake fingerprint attack on fingerprint recognition reliability, this application provides a fingerprint anti-counterfeiting method and an electronic device.

An embodiment of this application provides a fingerprint anti-counterfeiting method, including the following steps:

obtaining a fingerprint image generated by a fingerprint input action;

obtaining a vibration-sound signal generated by the fingerprint input action; and determining, based on a fingerprint anti-counterfeiting model, whether the fingerprint image and the vibration-sound signal are generated by a fingerprint input action of a true finger, where the fingerprint anti-counterfeiting model is a multi-dimensional network model obtained through fusion learning or separate learning based on a plurality of fingerprint images for training and corresponding vibration-sound signals in a multi-dimensional anti-counterfeiting network.

In an embodiment, the fingerprint anti-counterfeiting model includes a multi-dimensional network model obtained through training based on a plurality of training sample pairs including the plurality of fingerprint images for training and the corresponding vibration-sound signals in the multi-dimensional anti-counterfeiting network. The step of determining, based on a fingerprint anti-counterfeiting model, whether the fingerprint input is generated by a fingerprint input action of a true finger includes:

forming a to-be-determined sample pair by using the fingerprint image and the vibration-sound signal; and inputting the to-be-determined sample pair into the multi-dimensional network model to obtain a computation result.

In an embodiment, the multi-dimensional anti-counterfeiting network includes a fingerprint image subnetwork and a vibration-sound signal subnetwork, respectively for performing feature extraction on the fingerprint image and the vibration-sound signal.

In an embodiment, the plurality of fingerprint images for training and the corresponding vibration-sound signals are separately normalized before the plurality of fingerprint images for training and the corresponding vibration-sound signals form the plurality of training samples. The method further includes a step of separately normalizing the fingerprint image and the vibration-sound signal before the step of forming a to-be-determined sample pair by using the fingerprint image and the vibration-sound signal.

In an embodiment, an electronic device stores the fingerprint anti-counterfeiting model. The multi-dimensional anti-counterfeiting network includes a fingerprint image subnetwork and a vibration-sound signal subnetwork. The multi-dimensional anti-counterfeiting network is trained based on a training set including the plurality of fingerprint images for training and the plurality of corresponding vibration-sound signals. The step of determining, based on a fingerprint anti-counterfeiting model, whether the fingerprint image and the vibration-sound signal are generated by a fingerprint input action of a true finger includes:

inputting the fingerprint image into the fingerprint image subnetwork to obtain a first feature vector;

inputting the vibration-sound signal into the vibration-sound signal subnetwork to obtain a second feature vector;

fusing the first feature vector and the second feature vector to obtain a third feature vector;

classifying, by the electronic device, the third feature vector to calculate a classification result; and determining, by the electronic device based on the classification result, that the fingerprint input action is generated by the true finger or generated by a fake finger.

In an embodiment, an electronic device stores the fingerprint anti-counterfeiting model. The multi-dimensional anti-counterfeiting network includes a fingerprint image subnetwork and a vibration-sound signal subnetwork. The fingerprint image subnetwork is trained based on a fingerprint image training set including the plurality of fingerprint images for training, and the vibration-sound signal subnetwork is trained based on a vibration-sound signal training set including the plurality of vibration-sound signals corresponding to the plurality of fingerprint images for training.

The step of the determining, based on a fingerprint anti-counterfeiting model, whether the fingerprint image and the vibration-sound signal are generated by a fingerprint input action of a true finger includes:

inputting the fingerprint image into the fingerprint image subnetwork to obtain a first feature vector;

inputting the vibration-sound signal into the vibration-sound signal subnetwork to obtain a second feature vector;

classifying, by the electronic device, the first feature vector and the second feature vector to calculate a classification result; and determining, by the electronic device based on the classification result, that the fingerprint input action is generated by the true finger or generated by a fake finger.

In an embodiment, the determining, by the electronic device based on the classification result, that the fingerprint input action is generated by the true finger or generated by a fake finger includes:

When the classification result includes a confidence level, if the confidence level is greater than or equal to a specified threshold, the electronic device determines that the fingerprint input action is generated by the true finger; or if the confidence level is less than the specified threshold, the electronic device determines that the fingerprint input action is generated by the fake finger. The confidence level is a confidence level that the fingerprint input action is generated by the true finger.

In an embodiment, the method further includes:

Before inputting the fingerprint image and the vibration-sound signal into the multi-dimensional anti-counterfeiting network, the electronic device fuses the fingerprint image and the vibration-sound signal; and after inputting the fingerprint image and the vibration-sound signal into the multi-dimensional anti-counterfeiting network, the electronic device separates the fingerprint image from the vibration-sound signal.

In an embodiment, the fingerprint image subnetwork includes a convolutional neural network, and the vibration-sound signal subnetwork includes a recurrent neural network.

In an embodiment, the method further includes: detecting whether a trigger event occurs, and when a detection result is that the trigger event occurs, controlling a fingerprint sensor to start fingerprint image collection to obtain the fingerprint image generated by the fingerprint input action, and controlling a vibration-sound sensor to start vibration and sound collection to obtain the vibration-sound signal generated by the fingerprint input action.

In an embodiment, the method further includes: detecting whether a trigger event occurs, and when a detection result is that the trigger event occurs, controlling a fingerprint sensor to start fingerprint image collection to obtain the fingerprint image generated by the fingerprint input action, controlling a vibration-sound excitation source to emit a vibration-sound excitation signal, and controlling a vibration-sound sensor to start vibration-sound signal collection after a preset latency that starts to be calculated when the vibration-sound excitation signal is emitted, to obtain the vibration-sound signal generated by the fingerprint input action.

In an embodiment, when the electronic device determines that the fingerprint input action is generated by the fake finger, the method further includes:

The electronic device determines that fingerprint recognition fails, and sends prompt information indicating that the fingerprint recognition fails.

In an embodiment, when the electronic device determines that the fingerprint input action is generated by the true finger, the method further includes:

The electronic device determines whether the fingerprint image matches a preset fingerprint image.

If the fingerprint image matches the preset fingerprint image, the electronic device determines that fingerprint recognition succeeds.

In an embodiment, the vibration-sound signal includes a mechanical vibration signal and a sound signal, and the vibration-sound sensor includes at least one of a microphone, a sound sensor, an acceleration sensor, a crash sensor, a displacement sensor, the acceleration sensor, and a force sensor.

In an embodiment, the fingerprint sensor includes at least one of an under-display/in-display optical fingerprint sensor, an ultrasonic fingerprint sensor, and a capacitive fingerprint sensor.

An electronic device is provided, including an input unit, a processor unit, and a storage unit.

The input unit includes a fingerprint sensor and a vibration-sound sensor. The fingerprint sensor is configured to collect a fingerprint image of a fingerprint input action, and the vibration-sound sensor is configured to collect a vibration-sound signal generated by the fingerprint input action.

The storage unit stores a computer program and a fingerprint anti-counterfeiting model. The fingerprint anti-counterfeiting model is a multi-dimensional network model obtained through fusion learning or separate learning based on a plurality of fingerprint images for training and corresponding vibration-sound signals in a multi-dimensional anti-counterfeiting network. The computer program includes instructions, and when the instructions are executed by the processor, the electronic device performs the following steps:

invoking the fingerprint sensor and the vibration-sound sensor to collect the fingerprint image and the vibration-sound signal; and determining, based on the collected fingerprint image, the collected vibration-sound signal, and the fingerprint anti-counterfeiting model, whether the fingerprint input action is generated by a true finger or generated by a fake finger.

In an embodiment, the vibration-sound sensor includes a vibration-sound excitation source and a vibration-sound sensing module. The vibration-sound excitation source is configured to emit a vibration-sound excitation signal, and the vibration-sound sensing module is configured to collect the vibration-sound signal generated by the fingerprint input action.

In an embodiment, the vibration-sound excitation source is configured to emit the vibration-sound excitation signal when being triggered by the fingerprint input action, and the vibration-sound sensing module is configured to start, after a preset latency that starts to be calculated when the vibration-sound excitation source is triggered, detecting the vibration-sound signal generated by both the fingerprint input action and the vibration-sound excitation signal.

In an embodiment, the vibration-sound signal includes a mechanical vibration signal and a sound signal, and the vibration-sound sensor includes at least one of a microphone, a sound sensor, an acceleration sensor, a crash sensor, a displacement sensor, the acceleration sensor, and a force sensor.

In an embodiment, the fingerprint sensor includes at least one of an under-display/in-display optical fingerprint sensor, an ultrasonic fingerprint sensor, and a capacitive fingerprint sensor.

In an embodiment, the fingerprint anti-counterfeiting model includes a model obtained through training based on a plurality of training sample pairs including the plurality of fingerprint images for training and the corresponding vibration-sound signals. The processor unit is further configured to: form a to-be-determined sample pair by using the fingerprint image and the vibration-sound signal, input the to-be-determined sample into the fingerprint anti-counterfeiting model to obtain a confidence level that the fingerprint input action is a true fingerprint, and determine, based on the confidence level and a specified threshold, whether the fingerprint input action is generated by the true finger.

In an embodiment, the multi-dimensional anti-counterfeiting network includes a fingerprint image subnetwork and a vibration-sound signal subnetwork.

In an embodiment, the fingerprint image subnetwork is obtained through training based on a fingerprint image training set including the plurality of fingerprint images for training. The vibration-sound signal subnetwork is obtained through training based on a vibration-sound signal training set including the plurality of vibration-sound signals corresponding to the plurality of fingerprint images for training. The processor unit is further configured to: input the fingerprint image into the fingerprint image subnetwork to obtain a first feature vector; input the vibration-sound signal into the vibration-sound subnetwork to obtain a second feature vector; fuse the first feature vector and the second feature vector to obtain a third feature vector; classify the third feature vector to calculate a classification result; and determine, based on the classification result, that the fingerprint input action is generated by the true finger or generated by the fake finger.

In an embodiment, the fingerprint image subnetwork is obtained through training based on a fingerprint image training set including the plurality of fingerprint images for training. The vibration-sound signal subnetwork is obtained through training based on a vibration-sound signal training set including the plurality of vibration-sound signals corresponding to the plurality of fingerprint images for training. The processor unit is further configured to: input the fingerprint image into the fingerprint image subnetwork to obtain a first feature vector; input the vibration-sound signal into the vibration-sound signal subnetwork to obtain a second feature vector; classify the first second feature vector and the second feature vector to calculate a classification result; and determine, based on the classification result, that the fingerprint input action is generated by the true finger or generated by the fake finger.

In an embodiment, the fingerprint image subnetwork includes a convolutional neural network, and the vibration-sound signal subnetwork includes a recurrent neural network.

An electronic apparatus is provided, including a processor and a memory. The memory stores at least one instruction, and when the at least one instruction is executed by the processor, the fingerprint anti-counterfeiting method described in any one of the foregoing embodiments can be implemented.

Compared with the conventional technology, in the electronic device, the fingerprint anti-counterfeiting method, and the electronic apparatus in this application, determining, based on the vibration-sound signal, whether the fingerprint image is true or fake may effectively defend against a fake fingerprint attack (especially a 3D fake fingerprint attack) faced by a current fingerprint solution. In addition, a structure and an integrated application of the vibration-sound sensor are also relatively simple, and therefore, a cost increase and integration difficulty caused by a hardware-based anti-counterfeiting solution can be effectively avoided. In addition, because the network model (for example, a first multi-dimensional network model and a second multi-dimensional network model) used for fingerprint anti-counterfeiting may provide fast upgraded protection against continuously emerging fake fingerprint attack manners, reliability is relatively high.

DESCRIPTION OF EMBODIMENTS

The following clearly and completely describes the technical solutions in embodiments of this application with reference to the accompanying drawings in embodiments of this application. It is clear that the described embodiments are merely some but not all of embodiments of this application. All other embodiments obtained by persons of ordinary skill in the art based on embodiments of this application without creative efforts shall fall within the protection scope of this application.

To make the objectives, features and advantages of this application more comprehensible, the following further describes in detail this application with reference to the accompanying drawings and specific embodiments.

To make persons skilled in the art understand the solutions in this application better, the following clearly and completely describes the technical solutions in embodiments of this application with reference to the accompanying drawings in embodiments of this application. It is clear that the described embodiments are merely some but not all of embodiments of this application. All other embodiments obtained by persons of ordinary skill in the art based on embodiments of this application without creative efforts shall fall within the protection scope of this application.

In the specification, claims, and accompanying drawings of this application, the terms "first", "second", "third", and the like are intended to distinguish between different objects but do not indicate a particular order. In addition, the term "include" and any other variant thereof are intended to cover a non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

Figure 1:
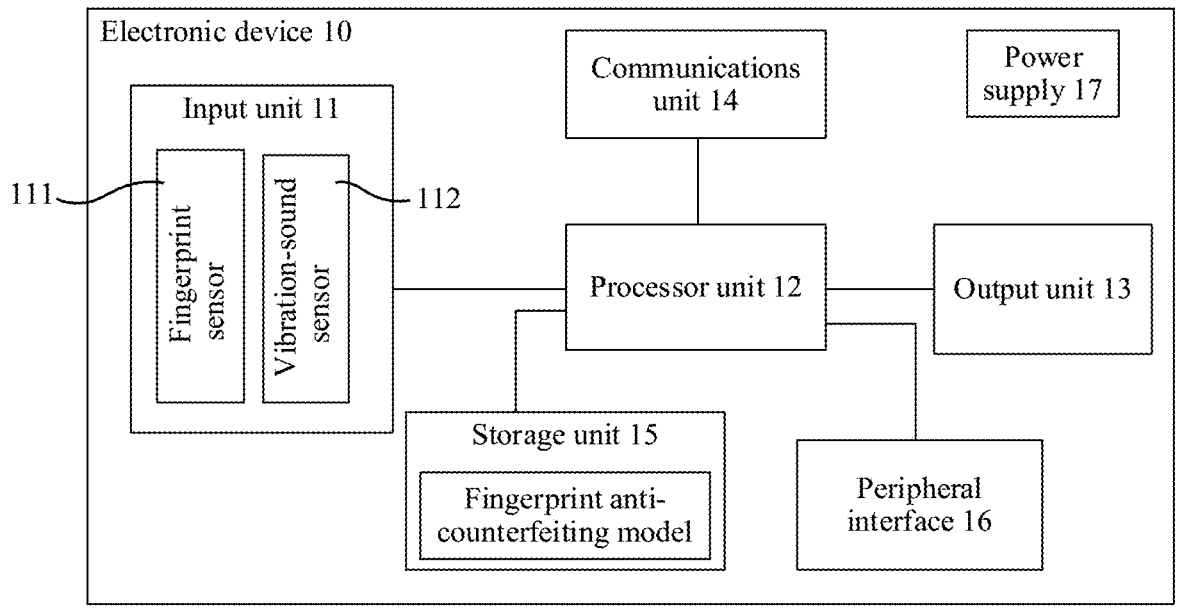
FIG. 1 is a schematic block diagram of a structure of an electronic device according to an embodiment of this application.

FIG. 1 is a schematic block diagram of a structure of an electronic device 10 according to an embodiment of this application. The electronic device 10 may be any mobile or portable electronic device or another intelligent terminal device, including but not limited to a mobile phone, a mobile computer, a tablet computer, a personal digital assistant (PDA), a wearable device, and a combination of two or more of the foregoing items; or may be another device having a fingerprint recognition function, for example, a fingerprint-based access control device, a financial device having a fingerprint recognition function, or another identity authentication device having a fingerprint recognition function.

As shown in FIG. 1, the electronic device 10 may include components such as an input unit 11, a processor unit 12, an output unit 13, a communications unit 14, a storage unit 15, and a peripheral interface 16. These components perform communication by using one or more buses. Persons skilled in the art may understand that the structure of the electronic device shown in the figure does not constitute any limitation to this application. The electronic device may have a bus structure or a star structure, or may include more or fewer components than those shown in the figure, or combine some components, or have different component arrangements.

The input unit 11 is configured to implement interaction between a user and the electronic device 10 and/or input information into the electronic device 10. In an implementation, the input unit 11 may receive digit or character information entered by the user, to generate a signal input related to user setting or function control. The input unit 11 may further include a touch panel, and the touch panel may be another human-machine interaction interface, and include elements such as a physical input button and a microphone, or may be another apparatus for capturing external information, such as a camera. The touch panel, also referred to as a touchscreen or a touch screen, may collect an operation action of the user touching or approaching the touch panel, for example, an operation action performed by the user on the touch panel or at a position close to the touch panel by using any appropriate object or accessory such as a finger or a stylus, and drive a corresponding connection apparatus according to a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts the electrical signal into coordinates of a touch point, and then sends the coordinates to a processing unit. The touch controller may further receive a command sent by the processing unit and execute the command. In addition, the touch panel may be implemented in a plurality of types, such as a resistive type, a capacitive type, an infrared ray, and a surface acoustic wave. In another implementation of this application, the physical input button used for the input unit may include but is not limited to one or more of a physical keyboard, a function button (such as a volume control button or an on/off button), a trackball, a mouse, a joystick, and the like. The input unit in a microphone form may collect a voice entered by the user or an environment, and convert the voice into a command that is in an electrical-signal form and that can be executed by the processing unit.

The processor unit 12 is further used as a control center of the electronic device, is connected to each part of the entire electronic device by using various interfaces and lines, and performs various functions of the electronic device and/or data processing by running or executing a software program and/or module stored in the storage unit and invoking data stored in the storage unit. The processor unit may include an integrated circuit (IC for short), for example, the processor unit may include a single packaged IC, or may include a plurality of connected packaged ICs that have a same function or different functions. For example, the processor unit may include only a central processing unit (CPU for short), or may be a combination of a GPU, a digital signal processor (DSP for short), and a control chip (for example, a baseband chip) in the communications unit. In an implementation of this application, the CPU may be a single computing core, or may include a plurality of computing cores.

The output unit 13 includes but is not limited to an image output unit and a sound output unit. The image output unit is configured to output a text, a picture, and/or a video. The image output unit may include a display panel, for example, a display panel configured in a form of an LCD (Liquid Crystal Display), an OLED (Organic Light-Emitting Diode), a field emission display (FED for short), or the like. Alternatively, the image output unit may include a reflective display, for example, an electrophoretic display or a display using an interferometric modulation of light technology. The image output unit may include a single display or a plurality of displays of different sizes. In a specific implementation of this application, the touch panel used for the input unit can also serve as the display panel of the output unit. For example, after detecting a gesture operation of touching or approaching the touch panel, the touch panel transmits the gesture operation to the processing unit to determine a type of a touch event, and subsequently, the processing unit provides corresponding visual output on the display panel according to the type of the touch event. Although in FIG. 1, the input unit and the output unit are used as two separate components to implement input and output functions of the electronic device, in some embodiments, the touch panel and the display panel may be integrated to implement the input and output functions of the electronic device. For example, the image output unit may display various graphical user interfaces (GUI for short) as virtual control components, including but not limited to a window, a scrollbar, an icon, and a scrapbook, so that a user performs an operation in a touch manner.

The communications unit 14 is configured to establish a communications channel, so that the electronic device 20 connects to a remote server by using the communications channel and downloads media data from the remote server. The communications unit may include communications modules such as a wireless local area network (wireless LAN for short) module, a Bluetooth module, an NFC module, and a baseband module, and a radio frequency (RF for short) circuit corresponding to the communications module. The communications unit is configured to perform wireless local area network communication, Bluetooth communication, NFC communication, infrared communication, and/or cellular communications system communication, for example, Wideband Code Division Multiple Access (W-CDMA for short) and/or High Speed Downlink Packet Access (HSDPA for short). The communications module is configured to control communication between components in the electronic device, and may support direct memory access.

The communications unit 14 may include the radio frequency circuit, and the radio frequency circuit may be configured to receive and send information or receive and send a signal in a call process. For example, after downlink information of a base station is received, the downlink information is sent to the processing unit for processing; and in addition, designed uplink data is sent to the base station. For another example, after information sent by an external NFC device is received, the information is sent to the processing unit for processing, and a processing result is sent to the external NFC device. Generally, the radio frequency circuit includes a well-known circuit configured to perform these functions, and includes but is not limited to an antenna system, a radio frequency transceiver, one or more amplifiers, a tuner, one or more oscillators, a digital signal processor, a codec chip set, a subscriber identity module (SIM) card, a memory, and the like. In addition, the radio frequency circuit may further communicate with a network and another device through wireless communication. The wireless communication may use any communications standard or protocol, including but not limited to a GSM (Global System of Mobile communication, Global System for Mobile Communications), a GPRS (General Packet Radio Service), CDMA (Code Division Multiple Access), WCDMA (Wideband Code Division Multiple Access), a high speed uplink packet access (HSUPA) technology, LTE (Long Term Evolution), an email, an SMS (Short Messaging Service), and the like.

The storage unit 15 may be configured to store a software program and a module. The processing unit executes various function applications of the electronic device and implements data processing by running the software program and the module stored in the storage unit. The storage unit mainly includes a program storage region and a data storage region. The program storage region may store an operating system, an application program required by at least one function, such as a sound play program or an image display program. The data storage region may store data (such as audio data or an address book) created according to use of the electronic device and the like. In a specific implementation of this application, the storage unit may include a volatile memory, such as a nonvolatile random access memory (NVRAM for short), a phase change random access memory (Phase Change RAM, PRAM for short), or a magnetoresistive random access memory (Magnetoresistive RAM, MRAM for short), or may include a nonvolatile memory, such as at least one magnetic disk storage component, an electrically erasable programmable read-only memory (EEPROM for short), or a flash memory component, such as a NOR flash memory or a NAND flash memory. The nonvolatile memory stores the operating system and the application program that are executed by the processing unit. The processing unit loads a running program and data from the nonvolatile memory to memory, and stores digital content in a massive storage apparatus. The operating system includes various components and/or drives that are configured to control and manage regular system tasks, for example, memory management, control of a storage device, and power management, and facilitate communication between various software and hardware. In an implementation of this application, the operating system may be an Android system of Google, an iOS system developed by Apple, a Windows operating system developed by Microsoft, or an embedded operating system such as VxWorks.

The software program stored in the storage unit 15 may include an application program. The application program may include any application installed on the electronic device, including but not limited to a browser, an email, an instant messaging service, word processing, keyboard virtualization, a window widget, encryption, digital copyright management, voice recognition, voice replication, positioning (for example, a function provided by a global positioning system), music playback, and the like.

The peripheral interface 16 may be an interface for connecting peripheral devices such as a main chassis, a display, and a keyboard. The peripheral interface is a logic circuit (which is a logic component) that connects a CPU, a memory, and a peripheral device of a computer, connects two peripheral devices, or connects two machines by using a system bus, and is a transfer station for information exchange between the CPU and the outside. The peripheral interface 16 may include an interface circuit, a connection cable, and the like.

It may be understood that the electronic device 10 further includes a power supply 17, and the power supply 17 is configured to supply power to different components of the electronic device to maintain running of the components. Generally, the power supply may be a built-in battery, for example, a common lithium-ion battery or a nickel metal hydride battery, or may include an external power supply that directly supplies power to the electronic device 10, for example, an AC adapter. In some implementations of this application, the power supply 17 may further be defined in a wider scope; for example, may further include a power management system, a power charging system, a power failure detection circuit, a power converter or inverter, a power status indicator (such as a light-emitting diode), and any other component related to power generation, management, and distribution of the electronic device.

In an implementation, the input unit 11 includes a fingerprint sensor 111 and a vibration-sound sensor 112, the fingerprint sensor 111 is configured to detect a fingerprint image generated by a fingerprint input action, and the vibration-sound sensor 112 is configured to detect a vibration-sound signal generated by the fingerprint input action. The processor unit 12 can receive the fingerprint image and the vibration-sound signal, and determine, based on a fingerprint anti-counterfeiting model, the fingerprint image, and the vibration-sound signal, whether the fingerprint input action is generated by a fingerprint input action of a true finger. The fingerprint anti-counterfeiting model is a multi-dimensional network model obtained through fusion learning or separate learning based on a plurality of fingerprint images for training and corresponding vibration-sound signals in a multi-dimensional anti-counterfeiting network. It may be understood that the processor unit 12 may further output, based on the determining, an identity authentication result indicating that fingerprint recognition succeeds or fails.

The fingerprint sensor 111 includes at least one of an optical fingerprint sensor (such as an under-display/in-display optical fingerprint sensor), an ultrasonic fingerprint sensor, and a capacitive fingerprint sensor. The vibration-sound sensor 112 includes at least one of a microphone, a sound sensor, an acceleration sensor, a crash sensor, a displacement sensor, the acceleration sensor, and a force sensor. The vibration-sound sensor 112 may be disposed close to the fingerprint sensor 111, for example, located below or on the periphery of the fingerprint sensor 111. It may be understood that the vibration-sound signal is generated by the vibration-sound sensor 112 based on the fingerprint input action, and the vibration-sound signal may include a mechanical vibration signal and a sound signal. In addition, currently, most electronic devices such as mobile phones are integrated with acceleration sensors, such as pendulous accelerometers, non-pendulous accelerometers, or MEMS accelerometers. The acceleration sensor may be configured to detect mechanical vibration signals of components such as an electronic device body, a PCB, and a screen during a fingerprint input action of a finger. Commonly used sound signal detection sensors include a capacitive microphone, a piezoelectric microphone, an MEMS microphone, and the like. An inherent microphone of the electronic device 10 may be configured to detect a sound signal generated during the fingerprint input action of the finger. As described above, the vibration-sound sensor 112 may collect, by using the acceleration sensor and a sound sensor such as the microphone that are inherent in the electronic device 10, the vibration-sound signal including the mechanical vibration signal and the sound signal. In this way, a technical effect of simple integration and application of the vibration-sound sensor 112 is implemented.

Specifically, after collecting the mechanical vibration signal and the sound signal, the vibration-sound sensor 112 may obtain the vibration-sound signal through sampling, where a duration of the vibration-sound signal may be 0.1 s, and a sampling rate may be 22.05 Hz, to convert an analog vibration-sound signal into a discrete sequential vibration-sound signal.

In an embodiment, the vibration-sound sensor 112 includes a vibration-sound excitation source 112a and a vibration-sound sensing module 112b. The vibration-sound excitation source 112a is configured to emit a vibration-sound excitation signal, and after the vibration-sound excitation signal is emitted, the vibration-sound sensing module 112b is configured to detect a vibration-sound signal generated by both a fingerprint input action of a finger and the excitation signal. In this way, a relatively strong vibration-sound signal is obtained, and detection sensitivity of the vibration-sound sensor is improved. Specifically, the vibration-sound excitation source 112a may be triggered by the fingerprint input action to emit the vibration-sound excitation signal, and after a preset latency that starts to be calculated when the vibration-sound excitation source 112a is triggered, the vibration-sound sensing module 112b starts detecting the vibration-sound signal generated by both the fingerprint input action and the excitation signal. It may be understood that the vibration-sound excitation source 112a includes but is not limited to a linear motor. Generally, the linear motor may generate an excitation signal whose frequency and amplitude are controllable, and an operating frequency of the linear motor may range from 150 Hz to 235 Hz.

Further, the fingerprint image and the corresponding vibration-sound signal may form a to-be-determined sample pair. For example, the processor unit 12 may receive the fingerprint image obtained by the fingerprint sensor and the vibration-sound signal obtained by the vibration-sound sensor, and fuse the fingerprint image and the vibration-sound signal to form a piece of signal data. The foregoing data fusion manner includes but is not limited to: extracting, from a sequence of the vibration-sound signal, a signal that matches fingerprint image data in time domain, and performing stitching and fusion. It should be noted that, before data fusion of the fingerprint image and the corresponding vibration-sound signal is performed, the fingerprint image and the corresponding vibration-sound signal should be normalized. For example, a pixel value of the fingerprint image and a sampling sequence of the vibration-sound signal are normalized to a specific range, for example, from 0 to 255. In this way, a data structure is neat and unified, and data fusion can be further performed. This facilitates data reading and management. Certainly, the fingerprint image and the vibration-sound signal each may alternatively not be normalized, so that the data includes more original information, and the processor unit 12 may perform corresponding preprocessing according to a requirement before the fingerprint image and the vibration-sound signal are input to the processor unit 12 or after the fingerprint image and the vibration-sound signal are input to the processor unit 12.

Figure 2:
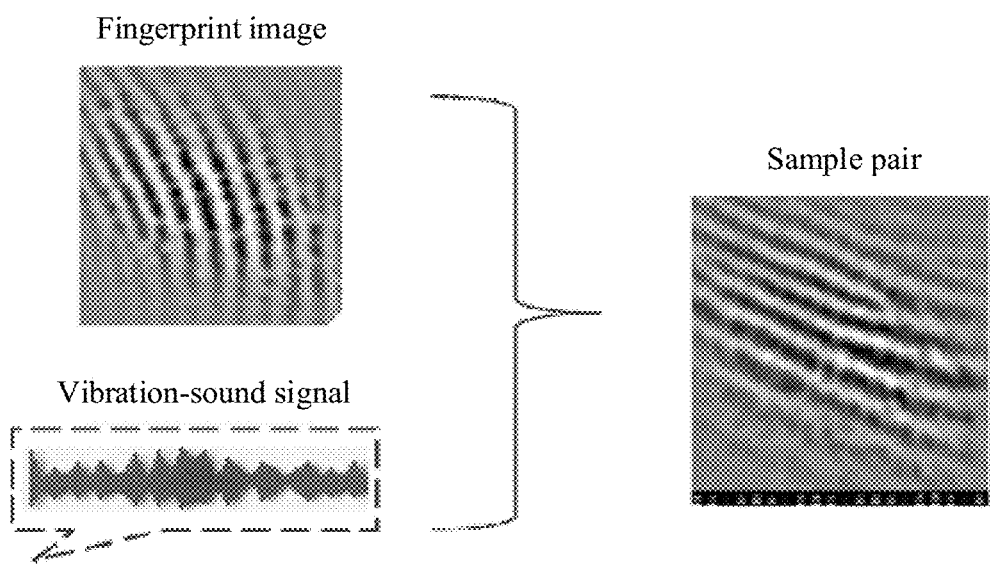
FIG. 2 is a schematic diagram of a sample pair that includes a fingerprint image and a vibration-sound signal and that is obtained by the electronic device shown in FIG. 1.

In an embodiment, after normalization, during data fusion, the processor unit 12 may crop out a strip-shaped region with a relatively small size at an edge of the fingerprint image, and stitch a vibration-sound signal that has a same size as the strip-shaped region to the edge of the cropped fingerprint image, or may directly stitch a strip-shaped vibration-sound signal to an edge of the fingerprint image. As shown in FIG. 2, an image size of a fingerprint image may be 160 pixels×160 pixels, and an image size of a to-be-determined sample pair obtained by stitching the fingerprint image and a vibration-sound signal may be 172 pixels×160 pixels.

Further, the storage unit 15 may store a computer program and the fingerprint anti-counterfeiting model. The fingerprint anti-counterfeiting model is the multi-dimensional network model obtained through fusion learning or separate learning based on the plurality of fingerprint images for training and the corresponding vibration-sound signals in the multi-dimensional anti-counterfeiting network. The computer program includes instructions, and when the instructions are executed by the processor, the electronic device performs the following steps:

invoking the fingerprint sensor and the vibration-sound sensor to collect the fingerprint image and the vibration-sound signal; and determining, based on the collected fingerprint image, the collected vibration-sound signal, and the fingerprint anti-counterfeiting model, whether the fingerprint input action is generated by a true finger or generated by a fake finger.

The fingerprint anti-counterfeiting model may be pre-stored in a storage apparatus that can be invoked by the processor unit 12 of the electronic device 10. The processor unit 12 may invoke the fingerprint anti-counterfeiting model according to the instructions of the computer program, and determine, based on the fingerprint anti-counterfeiting model, whether the fingerprint image and the vibration-sound signal are generated by the fingerprint input action of the true finger. It may be understood that the fingerprint anti-counterfeiting model may be updated or upgraded. For example, a latest network model is automatically downloaded or updated to by using a related network platform, to implement fast upgraded protection against continuously emerging fake fingerprint attack manners. This has relatively high reliability.

Figure 3:
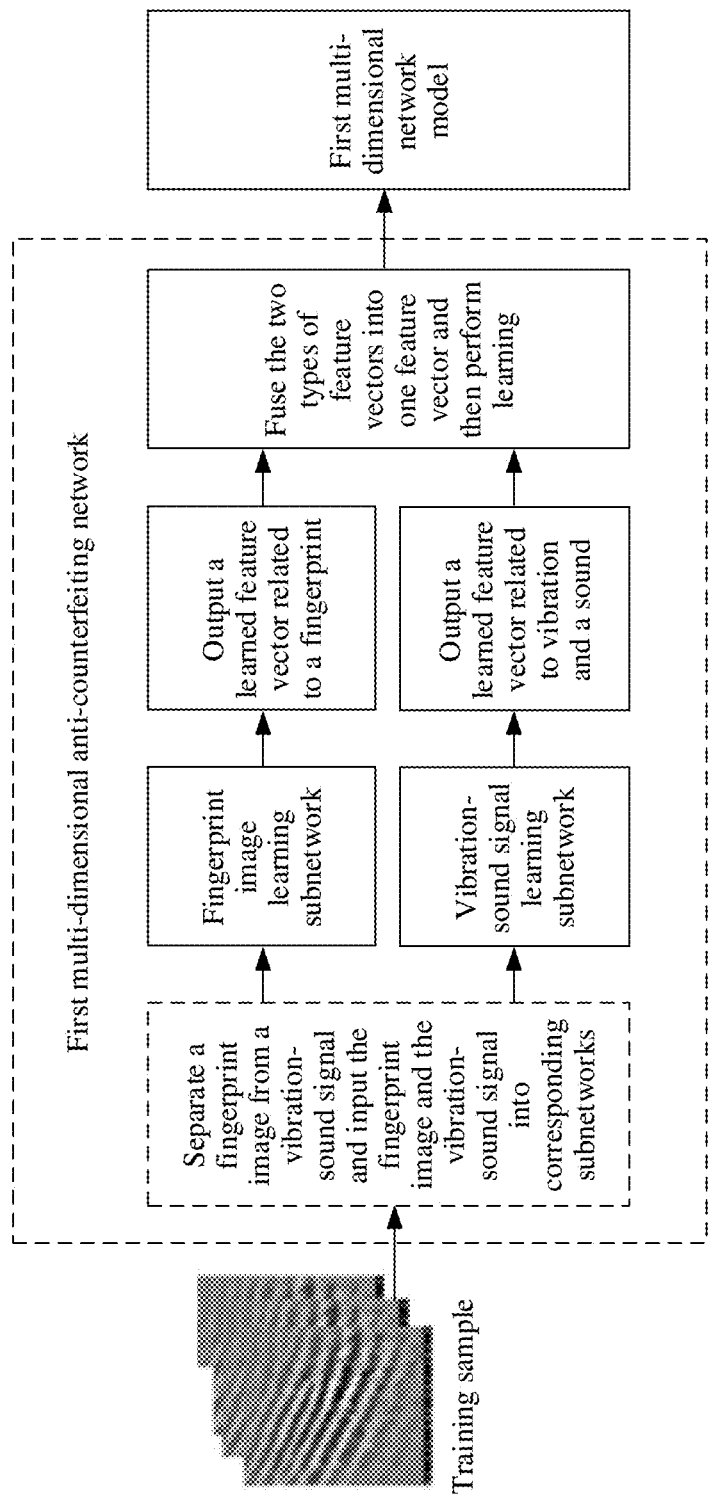
FIG. 3 is a schematic diagram of a principle of a fingerprint anti-counterfeiting model according to an embodiment.

FIG. 3 is a schematic diagram of a principle of a fingerprint anti-counterfeiting model according to an embodiment of this application. The following specifically describes a method for obtaining a fingerprint anti-counterfeiting model and performing fingerprint anti-counterfeiting by using the fingerprint anti-counterfeiting model. First, an electronic device (for example, the electronic device having the structure shown in FIG. 1) having a fingerprint sensor and a vibration-sound sensor may be provided to collect a fingerprint image of each press and a vibration-sound signal corresponding to the fingerprint image. Further, a computer is used to form a training sample pair by using the collected fingerprint image of the press and the corresponding vibration-sound signal. The sample pair may be a true fingerprint training sample pair, or may be a fake fingerprint training sample pair. Further, a large quantity of true or fake fingerprint training sample pairs form a training set of a multi-dimensional network. It may be understood that the computer may perform preprocessing (such as data normalization and fusion), cleaning (such as deleting invalid data), or the like on the fingerprint image and the corresponding vibration-sound signal. Then, a device (such as a server) having relatively high computing power may be further used to sequentially input training sample pairs including fingerprint images and vibration-sound signals in the training set into a first multi-dimensional anti-counterfeiting network. After repeated learning, the first multi-dimensional anti-counterfeiting network may obtain a trained fingerprint anti-counterfeiting model. The fingerprint anti-counterfeiting model may be stored in the storage unit 15 of the electronic device 10, and may further be invoked by the processor unit 12.

In the method shown in FIG. 3, the first multi-dimensional anti-counterfeiting network may include a fingerprint image subnetwork and a vibration-sound signal subnetwork. After the training samples including the fingerprint images and the vibration-sound signals in the training set enter the first multi-dimensional anti-counterfeiting network, a fingerprint image in each training sample may be separated from a vibration-sound signal, and the fingerprint image and the vibration-sound signal are separately input into the corresponding subnetworks. After the fingerprint image subnetwork performs feature learning on the fingerprint image, the fingerprint image subnetwork may output a learned first feature vector related to a fingerprint. After the vibration-sound signal subnetwork performs feature learning on the vibration-sound signal, the vibration-sound signal subnetwork may output a learned second feature vector related to the vibration-sound signal. The feature vector related to the fingerprint image and the feature vector related to the vibration-sound signal may be fused into a third feature vector. After classification calculation and loss function calculation are performed at a fully connected layer, back-propagation is performed to update a network parameter. A group of network parameters in an optimal state, namely, the fingerprint anti-counterfeiting model, is obtained through repeated learning. It may be understood that, in this embodiment, the fingerprint anti-counterfeiting model is a multi-dimensional network model obtained through fusion learning based on a plurality of fingerprint images for training and corresponding vibration-sound signals in the first multi-dimensional anti-counterfeiting network. The fingerprint image subnetwork is trained based on a fingerprint image training set including the plurality of fingerprint images for training, and the vibration-sound signal subnetwork is trained based on a vibration-sound signal training set including the plurality of vibration-sound signals corresponding to the plurality of fingerprint images for training.

In the first multi-dimensional anti-counterfeiting network, the fingerprint image subnetwork includes a convolutional neural network, and the vibration-sound signal subnetwork includes a recurrent neural network. Specifically, it may be understood that a network model having optimal performance in a test set may be stored as the trained first multi-dimensional network model. In addition, in a model training process, parameter data of the fingerprint image subnetwork and the vibration-sound signal subnetwork may be synchronously updated, and model data having optimal performance in the test set is stored. However, because structures and training data of the two subnetworks are greatly different, the parameter data of the two subnetworks may alternatively be asynchronously updated.

Further, in the embodiment shown in FIG. 3, specifically, the processor unit 12 may input the fingerprint image into the fingerprint image subnetwork to obtain the first feature vector, input the vibration-sound signal into the vibration-sound signal subnetwork to obtain the second feature vector, fuse the first feature vector and the second feature vector to obtain the third feature vector, calculate a classification result of the third feature vector, and determine, based on the classification result, that the fingerprint input action is generated by a true finger or generated by a fake finger. The classification result includes a confidence level. It may be understood that the confidence level is a confidence level that the fingerprint input action is generated by the true finger. If the confidence level is greater than or equal to a specified threshold, the processor unit 12 of the electronic device 10 determines that the fingerprint input action is generated by the true finger. If the confidence level is less than the specified threshold, the processor unit 12 of the electronic device 10 determines that the fingerprint input action is generated by the fake finger. For example, if the confidence level is greater than or equal to the specified threshold, the processor unit 12 determines that the fingerprint input action is generated by the true finger; or if the confidence level is less than the specified threshold, the processor unit 12 determines that the fingerprint input action is generated by the fake finger. The confidence level is the confidence level that the fingerprint input action is generated by the true finger. For example, when the classification result is that the confidence level that the fingerprint input action is generated by the true finger is 0.9, and the specified threshold is 0.5, it may be determined that the fingerprint input action is generated by the true finger.

Figure 4:
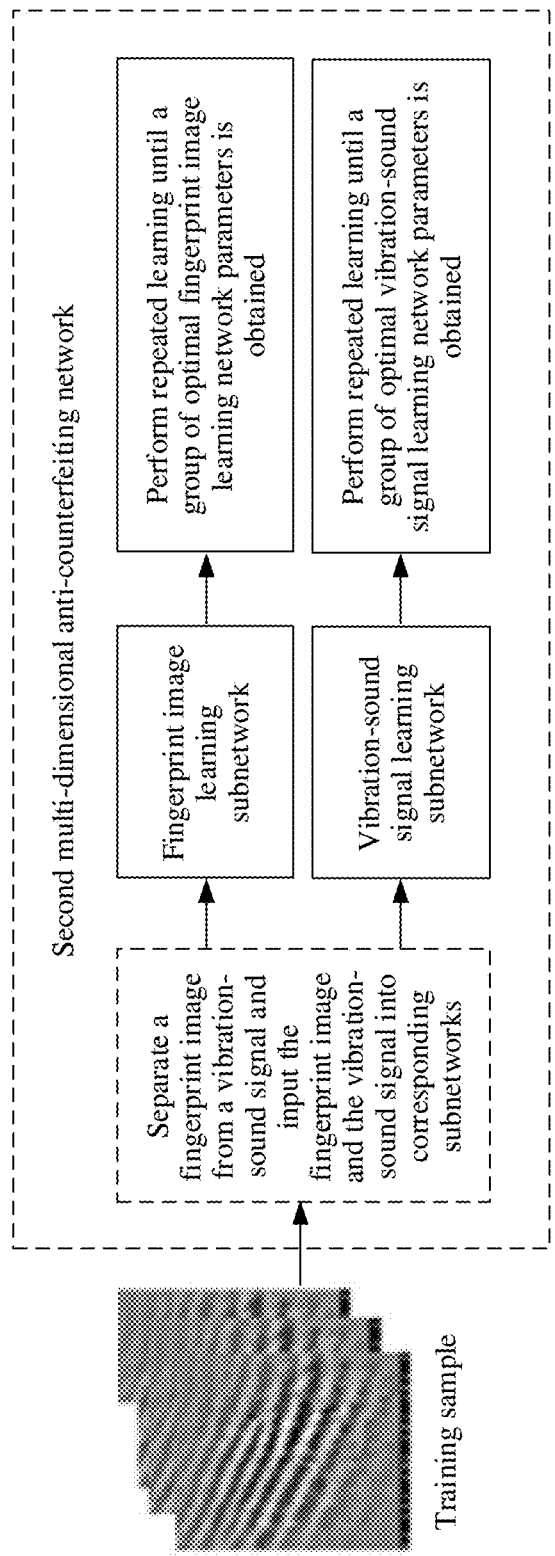
FIG. 4 is a schematic diagram of a principle of a fingerprint anti-counterfeiting model according to another embodiment.

FIG. 4 is a schematic diagram of a principle of obtaining a fingerprint anti-counterfeiting model according to an embodiment of this application. The following specifically describes another method for obtaining a fingerprint anti-counterfeiting model. First, an electronic device (for example, the electronic device having the structure shown in FIG. 1) having a fingerprint sensor and a vibration-sound sensor may be provided to collect a fingerprint image of each press and a vibration-sound signal corresponding to the fingerprint image. Further, a computer is used to form a training sample pair by using the collected fingerprint image of the press and the corresponding vibration-sound signal. The sample pair may be a true fingerprint training sample pair, or may be a fake fingerprint training sample pair. Further, a large quantity of true or fake fingerprint training sample pairs form a training set of a multi-dimensional network. It may be understood that the computer may perform preprocessing (such as data normalization and fusion), cleaning (such as deleting invalid data), or the like on the fingerprint image and the corresponding vibration-sound signal. Then, a device (such as a server) having relatively high computing power may be further used to sequentially input training sample pairs including processed fingerprint images and vibration-sound signals in the training set into a second multi-dimensional anti-counterfeiting network. The second multi-dimensional anti-counterfeiting network includes a fingerprint image subnetwork and a vibration-sound signal subnetwork. After repeated learning of the fingerprint images and the vibration-sound signals, the second multi-dimensional anti-counterfeiting network may obtain a trained fingerprint anti-counterfeiting model. The fingerprint anti-counterfeiting model may be stored in the storage unit 15 of the electronic device 10, and may further be invoked by the processor unit 12. It may be understood that, in the embodiment shown in FIG. 4, the fingerprint anti-counterfeiting model is a multi-dimensional network model obtained through separate learning based on a plurality of fingerprint images for training and corresponding vibration-sound signals in the fingerprint image subnetwork and the vibration-sound signal subnetwork.

In the method shown in FIG. 4, after the training samples including the fingerprint images and the vibration-sound signals in the training set enter the second multi-dimensional anti-counterfeiting network, a fingerprint image in each training sample may be separated from a vibration-sound signal, and the fingerprint image and the vibration-sound signal are separately input into the corresponding subnetworks. After the fingerprint image subnetwork performs repeated feature learning on data of the input fingerprint image, a group of parameters having an optimal test result is selected as a fingerprint image subnetwork. After the vibration-sound signal subnetwork performs repeated feature learning on the input vibration-sound signal, a group of parameters having an optimal test result is selected as a vibration-sound signal subnetwork. Because the fingerprint image subnetwork and the vibration-sound signal subnetwork are obtained through independent training, and are separately stored in the electronic device or another external storage apparatus that can be invoked by the processor unit, updating of parameter data of the two subnetworks in a model training process may not be considered currently. In addition, in the second multi-dimensional anti-counterfeiting network, the fingerprint image subnetwork may also include a convolutional neural network, and the vibration-sound signal subnetwork also includes a recurrent neural network.

In the embodiment shown in FIG. 4, specifically, the processor unit 12 may input the fingerprint image into the fingerprint image subnetwork to obtain a first feature vector, input the vibration-sound signal into the vibration-sound signal subnetwork to obtain a second feature vector, calculate a classification result of the first feature vector and the second feature vector, and determine, based on the classification result, that the fingerprint input action is generated by a true finger or generated by a fake finger. The classification result includes a confidence level. It may be understood that the confidence level is a confidence level that the fingerprint input action is generated by the true finger. If the confidence level is greater than or equal to a specified threshold, the processor unit 12 of the electronic device 10 determines that the fingerprint input action is generated by the true finger. If the confidence level is less than the specified threshold, the processor unit 12 of the electronic device 10 determines that the fingerprint input action is generated by the fake finger. For example, if the confidence level is greater than or equal to the specified threshold, the processor unit 12 determines that the fingerprint input action is generated by the true finger; or if the confidence level is less than the specified threshold, the processor unit 12 determines that the fingerprint input action is generated by the fake finger. The confidence level is the confidence level that the fingerprint input action is generated by the true finger. For example, when the classification result is that the confidence level that the fingerprint input action is generated by the true finger is 0.9, and the specified threshold is 0.5, it may be determined that the fingerprint input action is generated by the true finger.

Figure 5A:
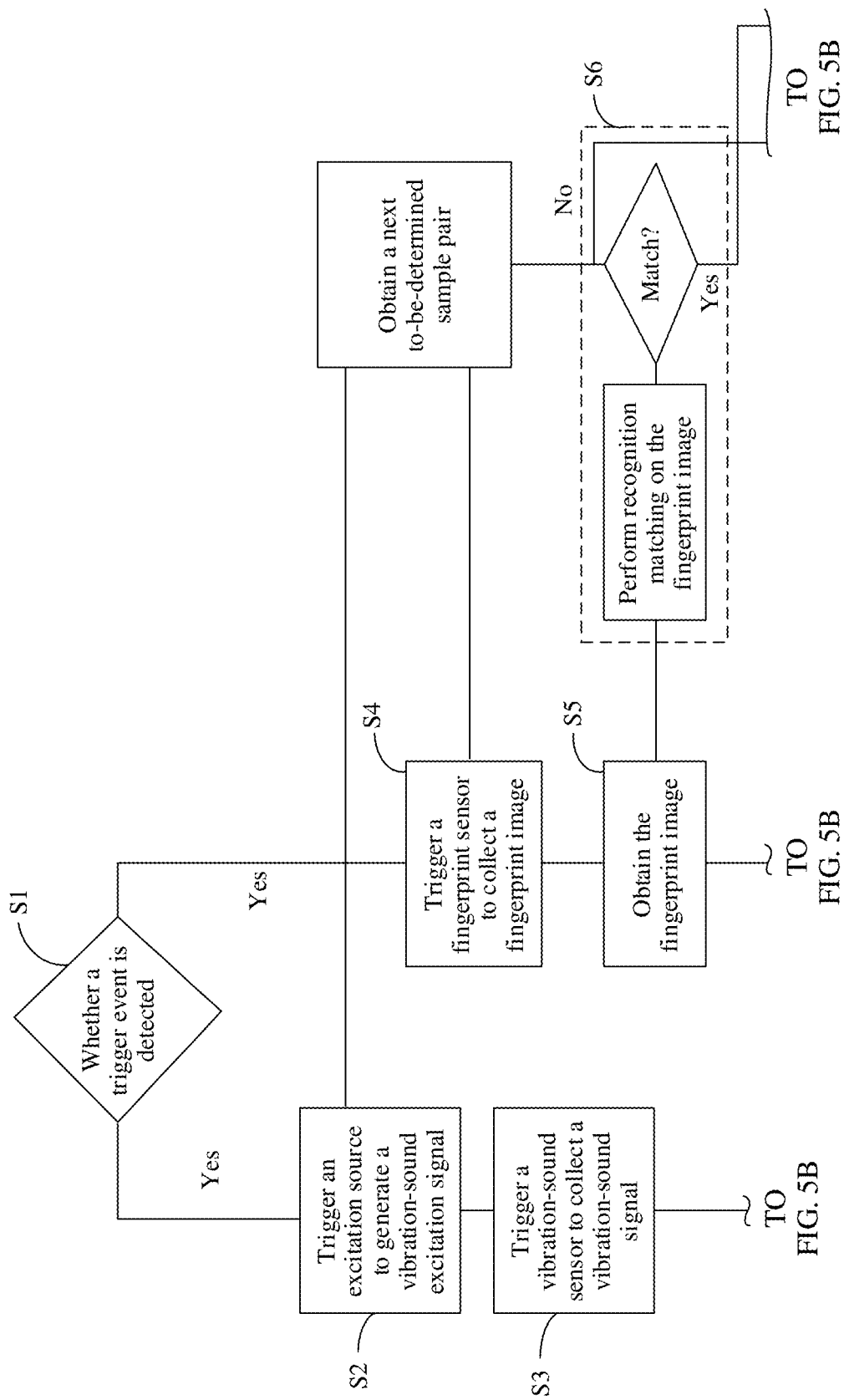
FIG. 5A and FIG. 5B are a flowchart of a fingerprint anti-counterfeiting method according to an embodiment of this application.
Figure 5B:
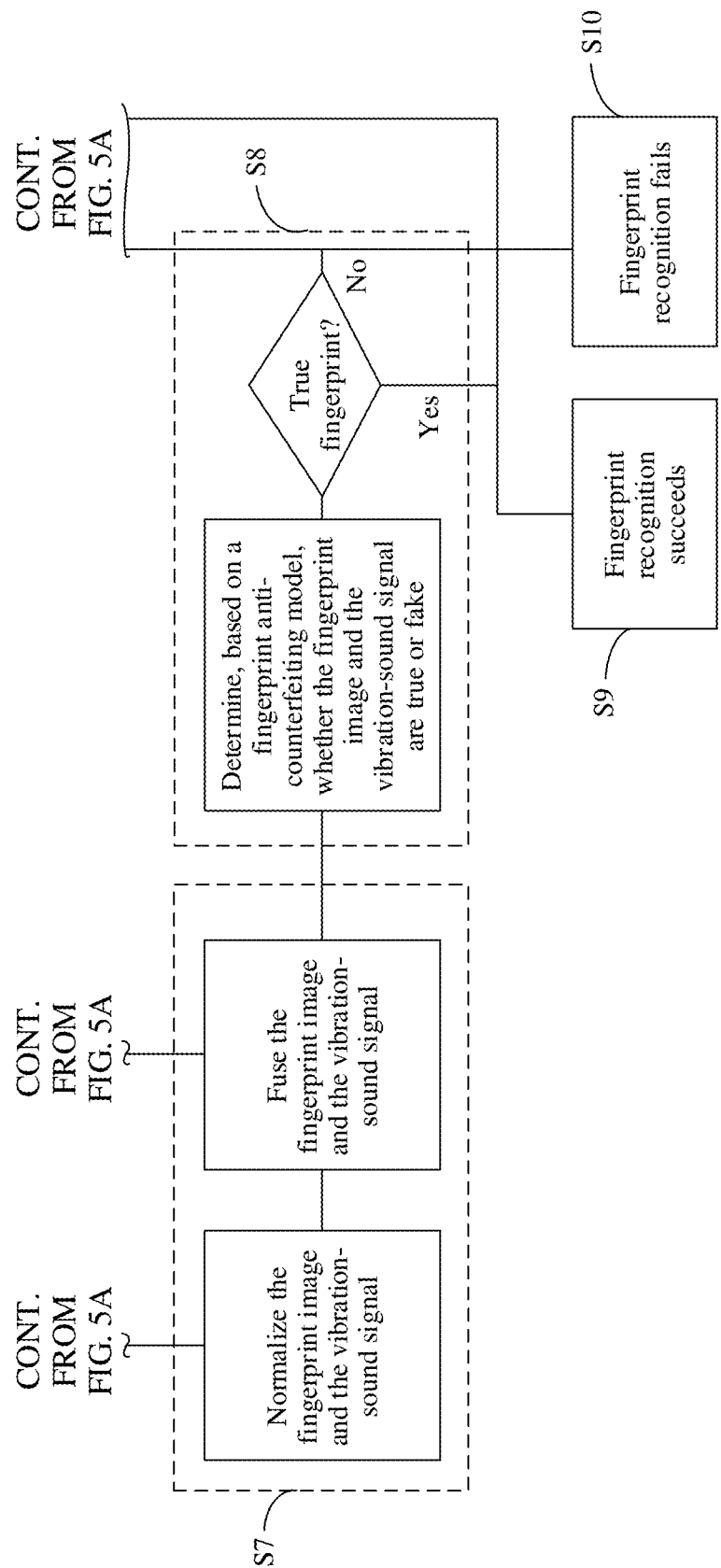

FIG. 5A and FIG. 5B are a flowchart of fingerprint anti-counterfeiting and recognition of the electronic device 10 according to an embodiment. It may be understood that the flowchart shown in FIG. 5A and FIG. 5B includes two aspects: fingerprint anti-counterfeiting and fingerprint recognition. Specifically, when starting to perform fingerprint anti-counterfeiting and recognition, the electronic device 10 may perform step S1 to first determine whether a trigger event is detected, for example, whether a touch signal is received in a fingerprint recognition region, and perform steps S2 and S4 if a determining result is that the trigger event is detected. For example, step S2 is performed to trigger a vibration-sound excitation source to generate a vibration-sound excitation signal, and then step S3 is performed to trigger a vibration-sound sensor to collect a vibration-sound signal. Step S4 is performed to trigger a fingerprint chip of a fingerprint sensor to start fingerprint image collection. Further, step S5 and step S7 are performed. In step S5, the fingerprint sensor obtains a fingerprint image, and the processor unit 12 may further perform step S6 to perform recognition matching on the fingerprint image. If a recognition matching result is that matching fails, a next to-be-determined sample pair may be obtained. In other words, steps S2 and S4 are performed. In step S7, the fingerprint image obtained in step S3 and the fingerprint image obtained in step S5 may further be normalized, so that the fingerprint image and the vibration-sound signal are fused to form a to-be-determined sample pair. Then step S8 is performed to determine, based on a fingerprint anti-counterfeiting model, whether the fingerprint image and the vibration-sound signal in the to-be-determined sample are true or fake. If it is determined that the fingerprint image and the vibration-sound signal are generated by a fingerprint input action of a true finger and the recognition matching result in step S6 is that matching succeeds, step S9 is performed to output an identity authentication result indicating that the fingerprint recognition succeeds. If it is determined that the fingerprint image and the vibration-sound signal are generated by a fingerprint input action of a fake finger or the recognition matching result in step S6 is that matching fails, step S10 is performed to output an identity authentication result indicating that the fingerprint recognition fails.

It may be understood that, the foregoing descriptions are mainly for an electronic device having a vibration-sound excitation source. When the determining result in step S1 is that the trigger event is detected, the electronic device performs step S2. But for an electronic device having no vibration-sound excitation source 112a, when the determining result in step S1 is that the trigger event is detected, the electronic device may alternatively directly perform step S3. In addition, for a fingerprint image and a vibration-sound signal on which neither of normalization and data fusion needs to be performed, the fingerprint image and the vibration-sound signal on which neither of normalization and fusion is performed may be separately input into the fingerprint anti-counterfeiting model. The fingerprint anti-counterfeiting model is used to separately perform determining on the fingerprint image and the vibration-sound signal. If it is determined that the fingerprint image and the vibration-sound signal are generated by a fingerprint input action of a true finger, step S9 is performed to output an identity authentication success result. If it is determined that the fingerprint image and the vibration-sound signal are generated by a fingerprint input action of a fake finger, step S10 is performed to output an identity authentication failure result.

In addition, it may be understood that, when the electronic device 10 determines that the fingerprint input action is generated by the fake finger, the method further includes: The electronic device 10 determines that the fingerprint recognition fails, and sends prompt information indicating that the fingerprint recognition fails.

Optionally, the fingerprint recognition procedure in step S6 and the fingerprint anti-counterfeiting procedure in step S8 may be performed in sequence, or the fingerprint anti-counterfeiting procedure in step S8 may be performed before or after the fingerprint recognition procedure in step S6. However, in the embodiment shown in FIG. 5A and FIG. 5B, the two procedures are performed in parallel.

Figure 6:
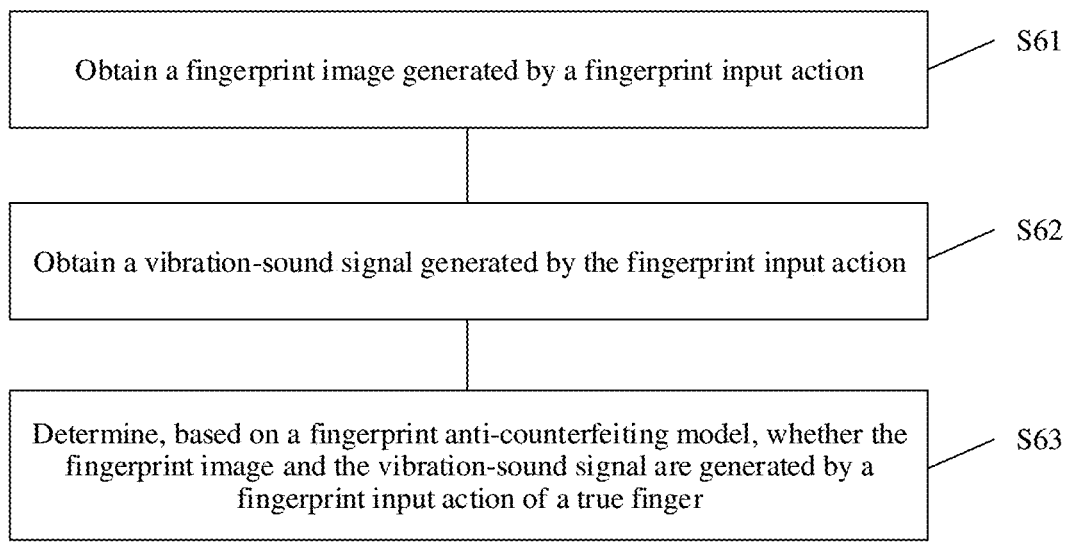
FIG. 6 is a schematic block diagram of an electronic apparatus using the fingerprint anti-counterfeiting method shown in FIG. 5A and FIG. 5B.

FIG. 6 is a flowchart of a fingerprint anti-counterfeiting method according to an embodiment of this application. The foregoing describes the principle for the electronic device 10 in this application to perform fingerprint anti-counterfeiting based on the vibration-sound signal. The following briefly describes, with reference to FIG. 5A and FIG. 5B, how the processor unit 12 of the electronic device 10 performs the fingerprint anti-counterfeiting method. The fingerprint anti-counterfeiting method may include the following steps: step S61, step S62, step S63, and step S64.

Step S61: Obtain a fingerprint image generated by a fingerprint input action.

Step S62: Obtain a vibration-sound signal generated by the fingerprint input action.

Step S63: Determine, based on a fingerprint anti-counterfeiting model, whether the fingerprint image and the vibration-sound signal are generated by a fingerprint input action of a true finger, where the fingerprint anti-counterfeiting model is a multi-dimensional network model obtained through fusion learning or separate learning based on a plurality of fingerprint images for training and corresponding vibration-sound signals in a multi-dimensional anti-counterfeiting network.

Specifically, in an embodiment, as shown in FIG. 5A and FIG. 5B, the method may further include: step S1 that is of detecting whether a trigger event occurs and that is performed before step S61, step S4 of controlling, when a detection result is that the trigger event occurs, the fingerprint sensor 111 to start fingerprint image collection to obtain the fingerprint image generated by the fingerprint input action, and step S3 of controlling the vibration-sound sensor 112 to start vibration and sound collection to obtain the vibration-sound signal generated by the fingerprint input action.

Specifically, in another embodiment, as shown in FIG. 6, the method further includes: detecting whether a trigger event occurs in step S1, and when a detection result is that the trigger event occurs, controlling the fingerprint sensor 111 to start fingerprint image collection to obtain the fingerprint image generated by the fingerprint input action, controlling a vibration-sound excitation source to emit a vibration-sound excitation signal, and controlling the vibration-sound sensor 112 to start vibration and sound collection after a preset latency that starts to be calculated when the vibration-sound excitation signal is emitted, to obtain the vibration-sound signal generated by the fingerprint input action.

Further, as described above, the vibration-sound signal includes a mechanical vibration signal and a sound signal, and the vibration-sound sensor 112 includes at least one of a microphone, a sound sensor, an acceleration sensor, a crash sensor, a displacement sensor, the acceleration sensor, and a force sensor. The fingerprint sensor 111 includes at least one of an under-display/in-display optical fingerprint sensor, an ultrasonic fingerprint sensor, and a capacitive fingerprint sensor.

Further, as described above, the fingerprint anti-counterfeiting model may include a network model obtained through training based on a plurality of training sample pairs including the plurality of fingerprint images for training and the corresponding vibration-sound signals in the multi-dimensional anti-counterfeiting network (for example, a first multi-dimensional anti-counterfeiting network), and step S64 may include the following steps:

forming a to-be-determined sample pair by using the fingerprint image and the vibration-sound signal; and inputting the to-be-determined sample pair into the fingerprint anti-counterfeiting model to obtain a computation result.

Further, as shown in FIG. 5A and FIG. 5B, the method may further include step S7 of separately normalizing the fingerprint image and the vibration-sound signal before the step of forming the to-be-determined sample pair by using the fingerprint image and the vibration-sound signal.

Further, in an embodiment, the multi-dimensional anti-counterfeiting network (such as the first multi-dimensional anti-counterfeiting network) includes a fingerprint image subnetwork and a vibration-sound signal subnetwork. The fingerprint image subnetwork and the vibration-sound signal subnetwork are respectively used to perform feature extraction on the fingerprint image and the vibration-sound signal. The fingerprint image subnetwork is trained based on a fingerprint image training set including the plurality of fingerprint images for training, and the vibration-sound signal subnetwork is trained based on a vibration-sound signal training set including the plurality of vibration-sound signals corresponding to the plurality of fingerprint images for training. The step of the determining, based on a fingerprint anti-counterfeiting model, whether the fingerprint image and the vibration-sound signal are generated by a fingerprint input action of a true finger includes:

inputting the fingerprint image into the fingerprint image subnetwork to obtain a first feature vector;

inputting the vibration-sound signal into the vibration-sound signal subnetwork to obtain a second feature vector;

fusing the first feature vector and the second feature vector to obtain a third feature vector; and inputting, by the electronic device 10, the third feature vector into a classification layer (for example, a softmax function, a sigmoid function, or another function having a classification effect) of the multi-dimensional anti-counterfeiting network for classification to calculate a classification result.

In another embodiment, the multi-dimensional anti-counterfeiting network includes a second multi-dimensional anti-counterfeiting network, including a fingerprint image subnetwork and a vibration-sound signal subnetwork. The fingerprint image subnetwork is trained based on a fingerprint image training set including the plurality of fingerprint images for training, and the vibration-sound signal subnetwork is trained based on a vibration-sound signal training set including the plurality of vibration-sound signals corresponding to the plurality of fingerprint images for training. The step of the determining, based on a fingerprint anti-counterfeiting model, whether the fingerprint image and the vibration-sound signal are generated by a fingerprint input action of a true finger includes:

inputting the fingerprint image into the fingerprint image subnetwork to obtain a first feature vector;

inputting the vibration-sound signal into the vibration-sound signal subnetwork to obtain a second feature vector;

classifying, by the electronic device, the first feature vector and the second feature vector to calculate a classification result; and determining, by the electronic device based on the classification result, that the fingerprint input action is generated by the true finger or generated by a fake finger.

In the another embodiment, it may be understood that the fingerprint image and the vibration-sound signal may also be normalized, and then the normalized fingerprint image and vibration-sound signal are separately input into the second multi-dimensional anti-counterfeiting network.

As described above, in the foregoing two embodiments, that the electronic device 10 determines, based on the classification result, that the fingerprint input action is generated by the true finger or generated by the fake finger may include:

When the classification result includes a confidence level, if the confidence level is greater than or equal to a specified threshold, the electronic device 10 (for example, the processor unit 12) determines that the fingerprint input action is generated by the true finger; or if the confidence level is less than the specified threshold, the electronic device 10 determines that the fingerprint input action is generated by the fake finger. The confidence level is a possibility that the fingerprint input action is generated by the true finger.

For example, a result obtained through calculation is the confidence level that the fingerprint input action is generated by the true finger. The electronic device determines, based on the classification result, that the fingerprint input action is generated by the true finger or generated by the fake finger. For example, when the classification result is that the confidence level that the fingerprint input action is generated by the true finger is 0.9, and the specified threshold is 0.5, it may be determined that the fingerprint input action is generated by the true finger.

Further, as described above, in the foregoing embodiments, before inputting the fingerprint image and the vibration-sound signal into the multi-dimensional anti-counterfeiting network, the electronic device 10 may fuse the fingerprint image and the vibration-sound signal.

In addition, after inputting the fingerprint image and the vibration-sound signal into the multi-dimensional anti-counterfeiting network, the electronic device 10 may separate the fingerprint image from the vibration-sound signal.

It may be understood that step S63 may include the foregoing steps S8, S9, and S10. As shown in steps S8, S9, and S10, when the electronic device 10 determines that the fingerprint input action is generated by the fake finger, the method further includes: The electronic device 10 determines that fingerprint recognition fails, and sends prompt information indicating that the fingerprint recognition fails.

Further, when the electronic device 10 determines that the fingerprint input action is generated by the true finger, the method further includes: The electronic device 10 determines whether the fingerprint image matches a preset fingerprint image. If the fingerprint image matches the preset fingerprint image, the electronic device 10 determines that fingerprint unlock succeeds. Optionally, the fingerprint recognition procedure in step S6 and the fingerprint anti-counterfeiting procedure in step S8 may be performed in parallel, or the fingerprint anti-counterfeiting procedure in step S8 may be performed before or after the fingerprint recognition procedure in step S6. However, as shown in FIG. 5A and FIG. 5B, preferably, the two procedures are performed in parallel.

Content such as the first multi-dimensional anti-counterfeiting network, the second multi-dimensional anti-counterfeiting network, and how to obtain the fingerprint anti-counterfeiting model is described in detail above.

Compared with the conventional technology, in the fingerprint anti-counterfeiting method and the electronic device 10 in this application, determining, based on the vibration-sound signal, whether the fingerprint image is true or fake may effectively defend against a fake fingerprint attack (especially a 3D fake fingerprint attack) faced by a current fingerprint solution. In addition, a structure and an integrated application of the vibration-sound sensor 112 are also relatively simple, and therefore, a cost increase and integration difficulty caused by a hardware-based anti-counterfeiting solution can be effectively avoided. In addition, because the fingerprint anti-counterfeiting model (for example, the first multi-dimensional network model and the second multi-dimensional network model) used for fingerprint anti-counterfeiting may provide fast upgraded protection against continuously emerging fake fingerprint attack manners, reliability is relatively high.

Figure 7:
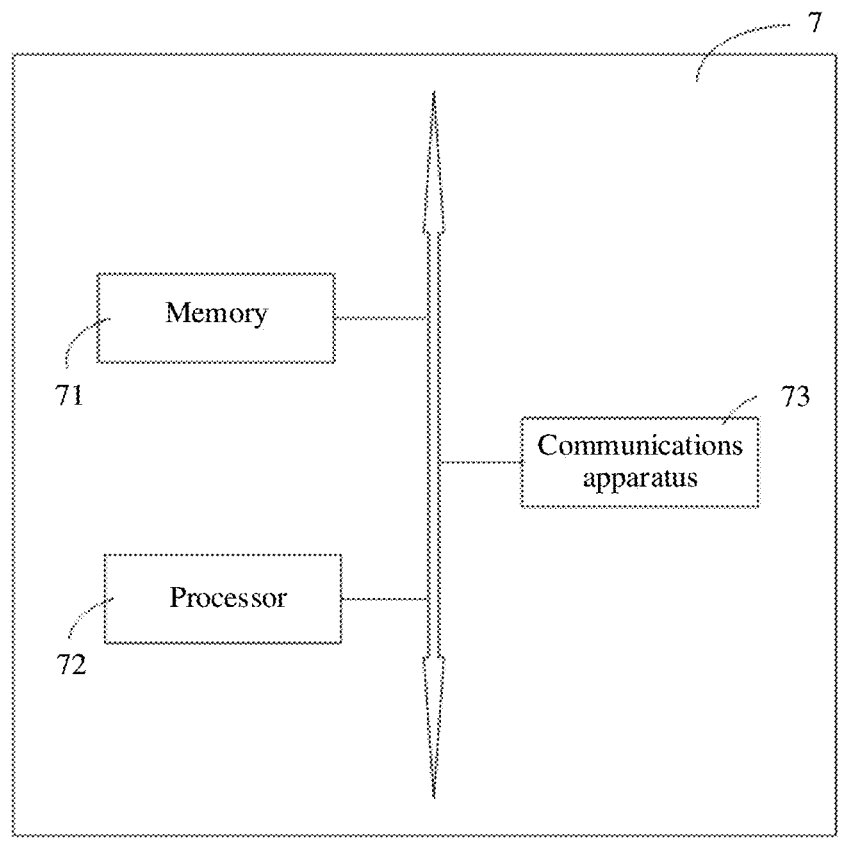
FIG. 7 is a schematic diagram of a structure of an electronic apparatus for performing a fingerprint anti-counterfeiting method according to an embodiment of this application.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application. FIG. 7 is a schematic diagram of a structure of an electronic apparatus 7 for performing the method in the foregoing embodiment. The electronic apparatus 7 includes but is not limited to at least one memory 71, at least one processor 72, at least one communications apparatus 73, and at least one communications bus. The communications bus is configured to implement connection and communication between these components.

The electronic apparatus 7 is a device that can automatically perform value calculation and/or information processing according to preset or stored instructions. Hardware of the electronic apparatus 7 includes but is not limited to a microprocessor, an application-specific integrated circuit (ASIC), a field-programmable gate array (FPGA), and a digital signal processor (DSP), an embedded device, and the like. The electronic apparatus 7 may further include a network device and/or user equipment. The network device includes but is not limited to a single network server, a server group including a plurality of network servers, or a cloud including a large quantity of hosts or network servers based on cloud computing, where the cloud computing is a type of distributed computing, and the cloud is a super virtual computer including a group of loosely coupled computers.

The electronic apparatus 7 may be but is not limited to any electronic product, for example, a terminal such as a tablet computer, a smartphone, a personal digital assistant (PDA), an intelligent wearable device, a camera device, or a monitoring device, that can perform man-machine interaction with a user by using a keyboard, a touchpad, a voice control device, or the like.

A network in which the electronic apparatus 7 is located includes but is not limited to the Internet, a wide area network, a metropolitan area network, a local area network, a virtual private network (VPN), or the like.

The communications apparatus may be a wired sending port, or may be a wireless device. For example, the communications apparatus includes an antenna apparatus, configured to perform data communication with another device.

The memory 71 is configured to store program code. The memory 71 may be a circuit having a storage function and having no physical form in an integrated circuit. For example, the memory 71 may be a RAM (Random Access Memory) or a FIFO (First In First Out) memory. Alternatively, the memory may be a memory having a physical form, for example, a storage device such as a memory module, a TF card (Trans-flash Card), a smart media card, a secure digital card, or a flash memory card.

The processor 72 may include one or more microprocessors and digital processors. The processor 52 may invoke the program code stored in the memory to perform a related function. For example, the modules in FIG. 6 are program code stored in the memory 71 and are executed by the processor 72, to implement the fingerprint anti-counterfeiting method. The processor is also referred to as a central processing unit (CPU), is a very large-scale integrated circuit, and is a computing core and a control core (Control Unit).

An embodiment of this application further provides a computer-readable storage medium. The computer-readable storage medium stores computer instructions. When the instructions are executed by one or more processors, the fingerprint anti-counterfeiting method in the foregoing method embodiment is performed.

The characteristic means in this application described above may be implemented by using an integrated circuit, and a function of the fingerprint anti-counterfeiting method in any one of the foregoing embodiments is controlled to be implemented.

All functions that can be implemented by the fingerprint anti-counterfeiting method in any embodiment can be installed in the electronic device by using the integrated circuit in this application, so that the electronic device performs the functions that can be implemented by the fingerprint anti-counterfeiting method in any embodiment. Details are not described herein again.

It should be noted that for brief description, the foregoing method embodiments are described as a series of actions. However, persons skilled in the art should appreciate that this application is not limited to the described order of the actions, because according to this application, some steps may be performed in another sequence or simultaneously. It should be further appreciated by persons skilled in the art that embodiments described in this specification all belong to preferred embodiments, and the involved actions and modules are not necessarily required by this application.

In the foregoing embodiments, descriptions of embodiments have respective focuses. For a part that is not described in detail in an embodiment, refer to related descriptions in other embodiments.

In several embodiments provided in this application, it should be understood that the disclosed apparatuses may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical form or other forms.

The units described as separate parts may or may not be physically separate, and parts displayed as units may or may not be physical units, and may be located in one position, or may be distributed on a plurality of network units. Some or all of the units may be selected according to actual requirements to achieve the objectives of the solutions of embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in the embodiments of this application. The foregoing storage medium includes any medium that can store program code, such as a USB flash drive, a read-only memory (ROM), a random access memory (RAM), a removable hard disk, a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A fingerprint anti-counterfeiting method performed by an electronic device, comprising:
    obtaining a fingerprint image generated by a fingerprint input action;
    obtaining a vibration-sound signal generated by the fingerprint input action; and
    determining, based on a fingerprint anti-counterfeiting model, whether the fingerprint input action is performed by a true finger, wherein the fingerprint anti-counterfeiting model is a multi-dimensional network model obtained through fusion learning or separate learning based on a plurality of fingerprint images for training and corresponding vibration-sound signals in a multi-dimensional anti-counterfeiting network.

2. The method according to claim 1, wherein the fingerprint anti-counterfeiting model comprises a multi-dimensional network model obtained through training based on a plurality of training sample pairs comprising the plurality of fingerprint images for training and the corresponding vibration-sound signals in the multi-dimensional anti-counterfeiting network, and determining whether the fingerprint input action is performed by the true finger comprises:
    forming a to-be-determined sample pair by using the fingerprint image generated by the fingerprint input action and the vibration-sound signal generated by the fingerprint input action; and
    inputting the to-be-determined sample pair into the multi-dimensional network model to obtain a computation result.

3. The method according to claim 2, wherein the multi-dimensional anti-counterfeiting network comprises a fingerprint image subnetwork and a vibration-sound signal subnetwork respectively for performing feature extraction on the fingerprint image generated by the fingerprint input action and the vibration-sound signal generated by the fingerprint input action;
    wherein the plurality of fingerprint images for training and the corresponding vibration-sound signals are separately normalized before the plurality of fingerprint images for training and the corresponding vibration-sound signals form the plurality of training sample pairs, and the method further comprises separately normalizing the fingerprint image generated by the fingerprint input action and the vibration-sound signal generated by the fingerprint input action before forming the to-be-determined sample pair by using the fingerprint image generated by the fingerprint input action and the vibration-sound signal generated by the fingerprint input action.

4. The method according to claim 1, further comprising: detecting whether a trigger event occurs, and upon detecting that the trigger event occurs, controlling a fingerprint sensor to start fingerprint image collection to obtain the fingerprint image generated by the fingerprint input action, and controlling a vibration-sound sensor to start vibration and sound collection to obtain the vibration-sound signal generated by the fingerprint input action.

5. The method according to claim 1, further comprising: detecting whether a trigger event occurs, and upon detecting that the trigger event occurs, controlling a fingerprint sensor to start collecting the fingerprint image generated by the fingerprint input action, controlling a vibration-sound excitation source to emit a vibration-sound excitation signal, and controlling a vibration-sound sensor to start collecting the vibration-sound signal generated by the fingerprint input action after a preset latency that starts to be calculated when the vibration-sound excitation signal is emitted.

6. The method according to claim 1, wherein when the electronic device determines that the fingerprint input action is generated by a fake finger, the method further comprises:
    determining, by the electronic device, that fingerprint recognition fails, and sending prompt information indicating that the fingerprint recognition fails.

7. The method according to claim 1, wherein when the electronic device determines that the fingerprint input action is generated by the true finger, the method further comprises:
    determining, by the electronic device, whether the fingerprint image generated by the fingerprint input action matches a preset fingerprint image; and
    when the fingerprint image matches the preset fingerprint image, determining, by the electronic device, that fingerprint recognition succeeds.

8. The method according to claim 4, wherein the vibration-sound signal the vibration-sound signal comprises a mechanical vibration signal and a sound signal, and the vibration-sound sensor comprises at least one of a microphone, a sound sensor, an acceleration sensor, a crash sensor, a displacement sensor, the acceleration sensor, or a force sensor.

9. The method according to claim 4, wherein the fingerprint sensor comprises at least one of an optical fingerprint sensor, an ultrasonic fingerprint sensor, or a capacitive fingerprint sensor.

10. An electronic device, comprising an input, a processor, and a storage, wherein
the input comprises a fingerprint sensor and a vibration-sound sensor, the fingerprint sensor is configured to collect a fingerprint image of a fingerprint input action, and the vibration-sound sensor is configured to collect a vibration-sound signal generated by the fingerprint input action; and
the storage stores a computer program and a fingerprint anti-counterfeiting model, wherein the fingerprint anti-counterfeiting model is a multi-dimensional network model obtained through fusion learning or separate learning based on a plurality of fingerprint images for training and a plurality of corresponding vibration-sound signals in a multi-dimensional anti-counterfeiting network, the computer program comprises instructions, and when the instructions are executed by the processor, the electronic device performs operations comprising:
invoking the fingerprint sensor and the vibration-sound sensor to collect the fingerprint image of the fingerprint input action and the vibration-sound signal generated by the fingerprint input action; and
determining, based on the collected fingerprint image, the collected vibration-sound signal, and the fingerprint anti-counterfeiting model, whether the fingerprint input action is generated by a true finger or generated by a fake finger.

11. The electronic device according to claim 10, wherein the vibration-sound sensor comprises a vibration-sound excitation source and a vibration-sound sensing module, the vibration-sound excitation source is configured to emit a vibration-sound excitation signal, and the vibration-sound sensing module is configured to collect the vibration-sound signal generated by the fingerprint input action.

12. The electronic device according to claim 11, wherein the vibration-sound excitation source is configured to emit the vibration-sound excitation signal when being triggered by the fingerprint input action, and the vibration-sound sensing module is configured to start, after a preset latency that starts to be calculated when the vibration-sound excitation source is triggered, detecting the vibration-sound signal generated by both the fingerprint input action and the vibration-sound excitation signal.

13. The electronic device according to claim 10, wherein the vibration-sound signal generated by the fingerprint input action comprises a mechanical vibration signal and a sound signal, and the vibration-sound sensor comprises at least one of a microphone, a sound sensor, an acceleration sensor, a crash sensor, a displacement sensor, the acceleration sensor, or a force sensor.

14. The electronic device according to claim 10, wherein the fingerprint sensor comprises at least one of an optical fingerprint sensor, an ultrasonic fingerprint sensor, or a capacitive fingerprint sensor.

15. The electronic device according to claim 10, wherein the fingerprint anti-counterfeiting model comprises a model obtained through training based on a plurality of training sample pairs comprising the plurality of fingerprint images for training and the corresponding vibration-sound signals, and the processor is further configured to:
form a to-be-determined sample pair by using the fingerprint image of the fingerprint input action and the vibration-sound signal generated by the fingerprint input action,
input the to-be-determined sample pair into the fingerprint anti-counterfeiting model to obtain a confidence level indicating a probability that the fingerprint input action is a true fingerprint, and
determine, based on the confidence level and a specified threshold, whether the fingerprint input action is generated by the true finger.

16. The electronic device according to claim 10, wherein the multi-dimensional anti-counterfeiting network comprises a fingerprint image subnetwork and a vibration-sound signal subnetwork.

17. The electronic device according to claim 16, wherein the fingerprint image subnetwork is obtained through training based on a fingerprint image training set comprising the plurality of fingerprint images for training, the vibration-sound signal subnetwork is obtained through training based on a vibration-sound signal training set comprising the plurality of vibration-sound signals corresponding to the plurality of fingerprint images for training, and the processor is further configured to:
input the fingerprint image of the fingerprint input action into the fingerprint image subnetwork to obtain a first feature vector;
input the vibration-sound signal generated by the fingerprint input action into the vibration-sound signal subnetwork to obtain a second feature vector;
fuse the first feature vector and the second feature vector to obtain a third feature vector;
classify the third feature vector to calculate a classification result; and
determine, based on the classification result, that the fingerprint input action is generated by the true finger or generated by the fake finger.

18. The electronic device according to claim 16, wherein the fingerprint image subnetwork is obtained through training based on a fingerprint image training set comprising the plurality of fingerprint images for training, the vibration-sound signal subnetwork is obtained through training based on a vibration-sound signal training set comprising the plurality of vibration-sound signals corresponding to the plurality of fingerprint images for training, and the processor is further configured to:
input the fingerprint image of the fingerprint input action into the fingerprint image subnetwork to obtain a first feature vector;
input the vibration-sound signal generated by the fingerprint input action into the vibration-sound signal subnetwork to obtain a second feature vector;
classify the first feature vector and the second feature vector to calculate a classification result; and
determine, based on the classification result, that the fingerprint input action is generated by the true finger or generated by the fake finger.

19. The electronic device according to claim 17, wherein the fingerprint image subnetwork comprises a convolutional neural network, and the vibration-sound signal subnetwork comprises a recurrent neural network.

20. An electronic apparatus, comprising a processor and a memory, wherein the memory stores at least one instruction, and when the at least one instruction is executed by the processor, the electronic apparatus performs operations comprising:
detecting a fingerprint input action;
obtaining a fingerprint image generated by the fingerprint input action;
obtaining a vibration-sound signal generated by the fingerprint input action; and determining, based on a fingerprint anti-counterfeiting model, whether the fingerprint input action is performed by a true finger, wherein the fingerprint anti-counterfeiting model is a multi-dimensional network model obtained through fusion learning or separate learning based on a plurality of fingerprint images for training and corresponding vibration-sound signals in a multi-dimensional anti-counterfeiting network.

* * * * *